United States Patent
Nagata

(10) Patent No.: US 9,163,539 B2
(45) Date of Patent: Oct. 20, 2015

(54) REDUCING AGENT SUPPLY APPARATUS AND INTERNAL-COMBUSTION ENGINE EXHAUST GAS PURIFICATION APPARATUS

(75) Inventor: Masayasu Nagata, Kanagawa (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 14/131,473

(22) PCT Filed: Mar. 29, 2012

(86) PCT No.: PCT/JP2012/058318
§ 371 (c)(1),
(2), (4) Date: Jan. 8, 2014

(87) PCT Pub. No.: WO2013/008493
PCT Pub. Date: Jan. 17, 2013

(65) Prior Publication Data
US 2014/0165539 A1    Jun. 19, 2014

(30) Foreign Application Priority Data
Jul. 9, 2011   (JP) .................................. 2011-152396

(51) Int. Cl.
| | |
|---|---|
| *F01N 3/00* | (2006.01) |
| *F01N 3/10* | (2006.01) |
| *F01N 3/20* | (2006.01) |
| *F02D 41/00* | (2006.01) |
| *F02M 37/00* | (2006.01) |

(52) U.S. Cl.
CPC ........ *F01N 3/10* (2013.01); *F01N 3/208* (2013.01); *F01N 2610/144* (2013.01); *F01N 2900/1808* (2013.01); *F02D 41/0002* (2013.01); *F02M 37/0029* (2013.01); *Y02T 10/24* (2013.01)

(58) Field of Classification Search
USPC .......................... 60/286, 295, 297, 301, 303
See application file for complete search history.

(56) References Cited

U.S. PATENT DOCUMENTS

| | | | |
|---|---|---|---|
| 7,836,684 B2 * | 11/2010 | Starck et al. ..................... | 60/286 |
| 8,161,735 B2 * | 4/2012 | Kitazawa ......................... | 60/295 |

(Continued)

FOREIGN PATENT DOCUMENTS

| | | |
|---|---|---|
| DE | 102008063488 | 6/2010 |
| JP | 2011117441 | 6/2011 |

(Continued)

OTHER PUBLICATIONS

International Search Report for Application No. PCT/JP2012/058318 dated Jun. 19, 2012 (English Translation, 2 pages).

*Primary Examiner* — Binh Q Tran
(74) *Attorney, Agent, or Firm* — Michael Best & Friedrich LLP

(57) ABSTRACT

A reducing agent supply apparatus includes a pump, a reducing agent injection valve, a reducing agent supply passage, a reducing agent return passage, and a pressure sensor. Injection control of the liquid reducing agent by the reducing agent injection valve is performed while the reducing agent pressure is controlled so as to be maintained at a predetermined target pressure. The reducing agent supply apparatus also includes a passage throttle valve on the reducing agent return passage, a pump control device for feedback-controlling the output of the pump based on the difference between the reducing agent pressure and the target pressure, and a passage throttle valve control device for controlling the opening of the passage throttle valve according to a change in the operation amount of the reducing agent injection valve.

14 Claims, 13 Drawing Sheets

(56) References Cited

U.S. PATENT DOCUMENTS

| | | | |
|---|---|---|---|
| 8,359,833 B2 * | 1/2013 | Nalla et al. | 60/286 |
| 8,413,422 B2 * | 4/2013 | Kasahara | 60/277 |
| 8,893,480 B2 * | 11/2014 | Chiba et al. | 60/295 |
| 2011/0047972 A1 | 3/2011 | Bauer et al. | |

FOREIGN PATENT DOCUMENTS

| | | |
|---|---|---|
| WO | 2006/074833 | 7/2006 |
| WO | 2008102719 | 8/2008 |
| WO | 2010/119116 | 10/2010 |

* cited by examiner

41  PASSAGE SWITCHING VALVE CONTROL MEANS
43  PUMP CONTROL MEANS
45  REDUCING AGENT INJECTION VALVE CONTROL MEANS
47  PASSAGE THROTTLE VALVE CONTROL MEANS

[Fig6]

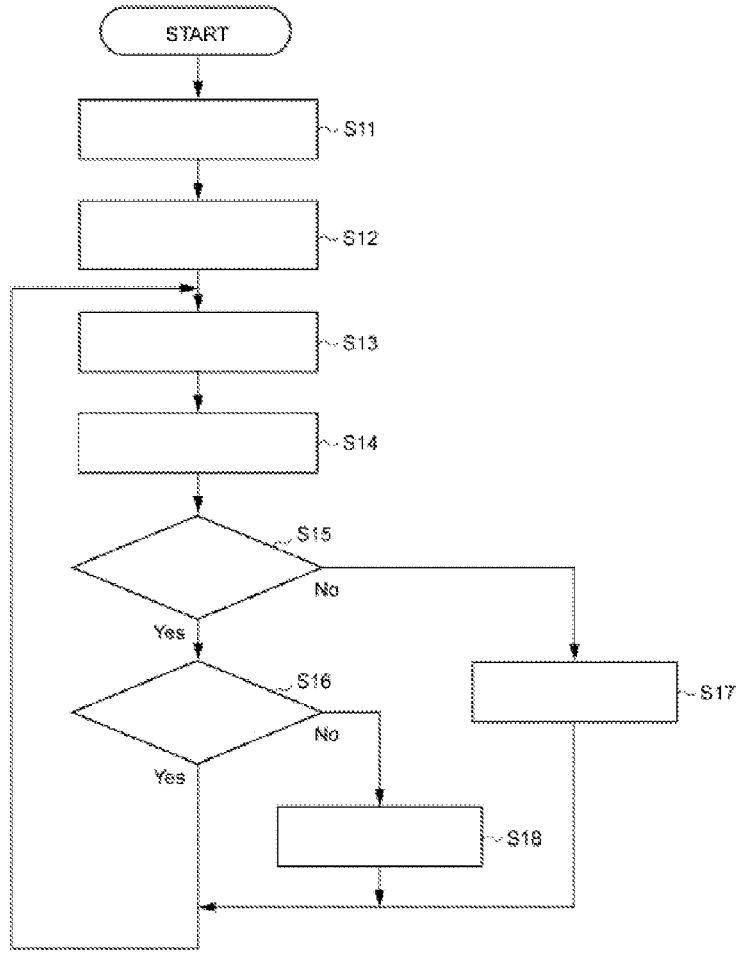

S11 START INJECTION CONTROL OF REDUCING AGENT

S12 OPENING OF PASSAGE THROTTLE VALVE = "Default State"

S13 STARTS CONTROLLING PASSAGE THROTTLE VALVE

S14 CALCULATES ΔDVduty (CURRENT - A NUMBER OF TIMES EARLIER)

S15 ΔDVduty < UPPER LIMIT THRESHOLD (>0)?

S16 ΔDVduty > LOWER LIMIT THRESHOLD (<0)?

S17 CLOSE CONTROL FOR OPENING OF PASSAGE THROTTLE VALVE

S18 OPEN CONTROL FOR OPENING OF PASSAGE THROTTLE VALVE

| S21 | OPENING OF PASSAGE THROTTLE VALVE = "Close State" |
| S22 | SET Tbfv_close |
| S23 | T ≥ Tbfv_close? |
| S24 | OPENING OF PASSAGE THROTTLE VALVE = "Default State" |

S31    OPENING OF PASSAGE THROTTLE VALVE = "Open State"

S32    SET Tbfv_open

S33    T ≥ Tbfv_open?

S34    OPENING OF PASSAGE THROTTLE VALVE = "Default State"

| 41 | PASSAGE SWITCHING VALVE CONTROL MEANS |
| 43 | PUMP CONTROL MEANS |
| 45 | REDUCING AGENT INJECTION VALVE CONTROL MEANS |
| 47 | PASSAGE THROTTLE VALVE CONTROL MEANS |
| 51 | CORRECTION MEANS |

S41 OPENING OF PASSAGE THROTTLE VALVE = "Close State"

S42 SET Tbfv_close

S44 UPDATE Pu_min

S45 T ≥ Tbfv_close?

S46 OPENING OF PASSAGE THROTTLE VALVE = "Default State"

S48 UPDATE Pu_min

S49 Pu ≥ Pu_tgt?

S51 CALCULATE Tbfv_close CORRECTION AMOUNT AT CLOSE CONTROL

S52 PERFORM CORRECTION

[REDUCING AGENT SUPPLY APPARATUS AND INTERNAL-COMBUSTION ENGINE EXHAUST GAS PURIFICATION APPARATUS

BACKGROUND OF THE INVENTION

The present invention relates to a reducing agent supply apparatus for supplying reducing agent to an exhaust gas passageway of an internal-combustion engine and an internal-combustion engine exhaust gas purification apparatus including such a reducing agent supply apparatus.

Conventionally, in an exhaust gas passageway of an internal-combustion engine included in a vehicle or the like, an exhaust gas purification apparatus for purifying nitrogen oxides ($NO_x$) contained within exhaust gas is provided. One aspect of such an exhaust gas purification apparatus is an exhaust gas purification apparatus that includes: an NO purification catalyst for speeding up reduction reaction of $NO_x$; and a reducing agent supply apparatus for supplying liquid reducing agent to within an exhaust gas passageway upstream of the $NO_x$ purification catalyst.

FIG. 13 illustrates an example of a reducing agent supply apparatus 220. The reducing agent supply apparatus 220 includes: a pump 223 for sucking up and pumping liquid reducing agent, such as unburnt fuel or ammonia aqueous solution, stored in a tank 221; a reducing agent injection valve 225 for injecting the pumped liquid reducing agent to within an exhaust gas passageway; a reducing agent supply passage 227 for guiding the liquid reducing agent pumped by the pump 223 to the reducing agent injection valve 225; a reducing agent return passage 229 connected between the reducing agent supply passage 227 and the tank 221; a pressure sensor 231 for detecting a reducing agent pressure Pu within the reducing agent supply passage 227; and a control unit 240 for controlling the pump 223 and the reducing agent injection valve 225.

Such an reducing agent supply apparatus 220 needs to perform injection control of liquid reducing agent considering the amount of $NO_x$ contained within exhaust gas, the reducing efficiency of $NO_x$ and the like so that an appropriate amount of liquid reducing agent will be supplied to within the exhaust gas passageway in just proportion. In order to do this, the injection amount of liquid reducing agent is controlled by adjusting when the reducing agent injection valve 225 is opened, while the pressure Pu of the reducing agent supplied to the reducing agent injection valve 225 is controlled so as to be maintained at a predetermined target pressure Pu_tgt.

Here, one way of controlling the reducing agent pressure Pu so as to be maintained at the target pressure Pu-tgt is to feedback-control the output of the pump 223 based on the difference ΔPu between the reducing agent pressure Pu detected by the pressure sensor 231 and the target pressure Pu_tgt (see JP-A-2011-117441).

SUMMARY OF THE INVENTION

However, attempting to maintain the reducing agent pressure Pu at the target pressure Pu_tgt only by feedback-controlling the output of the pump 223 may cause the reducing agent pressure Pu to largely deviate from the target pressure Pu_tgt when the injection amount of the liquid reducing agent significantly increases or decreases. As a result, even when the reducing agent injection valve 225 is appropriately controlled according to a target injection amount, the injection amount of the actually injected liquid reducing agent may deviate from the target injection amount. Furthermore, in a case such as when a diagnostic control using the reducing agent pressure Pu or the like is performed, the diagnostic accuracy may decrease.

The present inventors found that the above-described problem can be solved by providing a passage throttle valve in the middle of a reducing agent return passage and then controlling the opening of the passage throttle valve according to the change in the operation amount of the reducing agent injection valve in conjunction with the feedback-control of the output of the pump, and thus completed the invention. Thus, it is an object of the present invention to provide a reducing agent supply apparatus that can reduce the state of large deviation of the pressure within a reducing agent supply passage from a target pressure and an exhaust gas purification apparatus including such a reducing agent supply apparatus.

According to the invention, in order to solve the above-described problem, a reducing agent supply apparatus is provided, including: a pump for sucking up and pumping liquid reducing agent stored in a tank; a reducing agent injection valve for injecting the liquid reducing agent to within an exhaust gas passageway of an internal-combustion engine; a reducing agent supply passage for guiding the liquid reducing agent pumped from the pump to the reducing agent injection valve; a reducing agent return passage connected between the reducing agent supply passage and the tank; and a pressure sensor for detecting reducing agent pressure within the reducing agent supply passage, wherein injection control of the liquid reducing agent by the reducing agent injection valve is performed while the reducing agent pressure is controlled so as to be maintained at a predetermined target pressure, and wherein the reducing agent supply apparatus includes: a passage throttle valve provided on the reducing agent return passage and having an opening controlled by energization; a pump control means for feedback-controlling the output of the pump based on the difference between the reducing agent pressure and the target pressure; and a passage throttle valve control means for controlling the opening of the passage throttle valve according to the change in the operation amount of the reducing agent injection valve.

According to the reducing agent supply apparatus in accordance with the invention, in order to solve the above-described problem, in conjunction with feedback-control of the output of the pump, the opening of the passage throttle valve provided in the middle of the reducing agent return passage is adjusted according to the change in the operation amount of the reducing agent injection valve. In other words, according to the reducing agent supply apparatus in accordance with the invention, the state of large deviation of the pressure of reducing agent supplied to the reducing agent injection valve from a target pressure, causing liquid reducing agent to be injected into within the exhaust gas passageway in just proportion. Furthermore, when diagnostic control using the reducing agent pressure is performed, decrease in the diagnostic accuracy can be prevented.

Furthermore, in the reducing agent supply apparatus in accordance with the invention, the passage throttle valve control means, preferably: normally opens the passage throttle valve at a predetermined basic opening; when the operation amount of the reducing agent injection valve sharply increases, temporarily decreases the opening of the passage throttle valve; and, when the operation amount of the reducing agent injection valve sharply decreases, temporarily increases the opening of the passage throttle valve.

By controlling the passage throttle valve in this way, in response to significant increase or decrease in the injection amount of liquid reducing agent, the return flow rate in the reducing agent return passage is changed, which can prevent the reducing agent pressure from largely deviating from the target pressure.

Furthermore, in the reducing agent supply apparatus in accordance with the invention, the passage throttle valve control means preferably controls the opening of the passage throttle valve with a duration varied according to the amount of change in the operation amount of the reducing agent injection valve.

By controlling the passage throttle valve in this way, a passage throttle valve having a relatively simple configuration may be used, which can improve the accuracy of the pressure control while saving the cost.

Furthermore, in the reducing agent supply apparatus in accordance with the invention, the passage throttle valve control means preferably controls the opening of the passage throttle valve with an operation amount varied according to the amount of change in the operation amount of the reducing agent injection valve.

By controlling the passage throttle valve in this way, the return flow rate is adjusted according to the rate of increase or decrease in the injection amount of liquid reducing agent, which can prevent the reducing agent pressure from largely deviating from the target pressure.

Furthermore, in the reducing agent supply apparatus in accordance with the invention, a correction means for correcting the duration or the operation amount for changing the opening of the passage throttle valve so that, when the opening of the passage throttle valve is temporarily changed to cause the reducing agent pressure to be more than an upper limit threshold or less than a lower limit threshold, the reducing agent pressure will be within a range between the lower and upper limit thresholds next time and later is preferably included.

By controlling the passage throttle valve in this way, the duration or operation amount for changing the opening of the passage throttle valve is corrected according to the state of the difference between the reducing agent pressure and the target pressure as a result of adjusting the opening of the passage throttle valve, which can prevent the reducing agent pressure from largely deviating from the target pressure for a long period of time.

Furthermore, in the reducing agent supply apparatus in accordance with the invention, preferably, the reducing agent supply apparatus includes: a passage switching valve that, while the injection control of the liquid reducing agent is being performed, is not energized and causes the pumped liquid reducing agent to flow to the reducing agent injection valve side, and, when the injection control of the liquid reducing agent is terminated, is energized and causes the pumped liquid reducing agent to flow to the tank side; and a passage switching valve control means for controlling energization of the passage switching valve, wherein the pump, the passage throttle valve and the passage switching valve are configured as one unit, wherein the passage switching valve control means and the passage throttle valve control means are configured as one control unit, and wherein the control of the passage throttle valve and the control of the passage switching valve are performed through one harness.

Configuring the reducing agent supply apparatus in this way allows configuring the reducing agent supply apparatus in accordance with the invention without the need for an additional harness in contrast to a conventional reducing agent supply apparatus.

Another aspect of the invention is an internal-combustion engine exhaust gas purification apparatus including: any reducing agent supply apparatus described above; and an $NO_x$ purification catalyst for purifying nitrogen oxides contained within exhaust gas.

According to the internal-combustion engine exhaust gas purification apparatus in accordance with the invention, the reducing agent supply apparatus that can reduce the state of large deviation of the pressure of reducing agent supplied to the reducing agent injection valve from a target pressure is included, which allows liquid reducing agent to be injected in just proportion and allows nitrogen oxides to be efficiently purified. Furthermore, according to the internal-combustion engine exhaust gas purification apparatus in accordance with the invention, the reducing agent supply apparatus as described above is included, which can precisely perform diagnostic control using the reducing agent pressure.

BRIEF DESCRIPTION OF THE DRAWINGS

FIG. 6. is a flowchart illustrating an example of a method for controlling the passage throttle valve in the reducing agent supply apparatus in accordance with the first embodiment.

DETAILED DESCRIPTION

Figure 1:
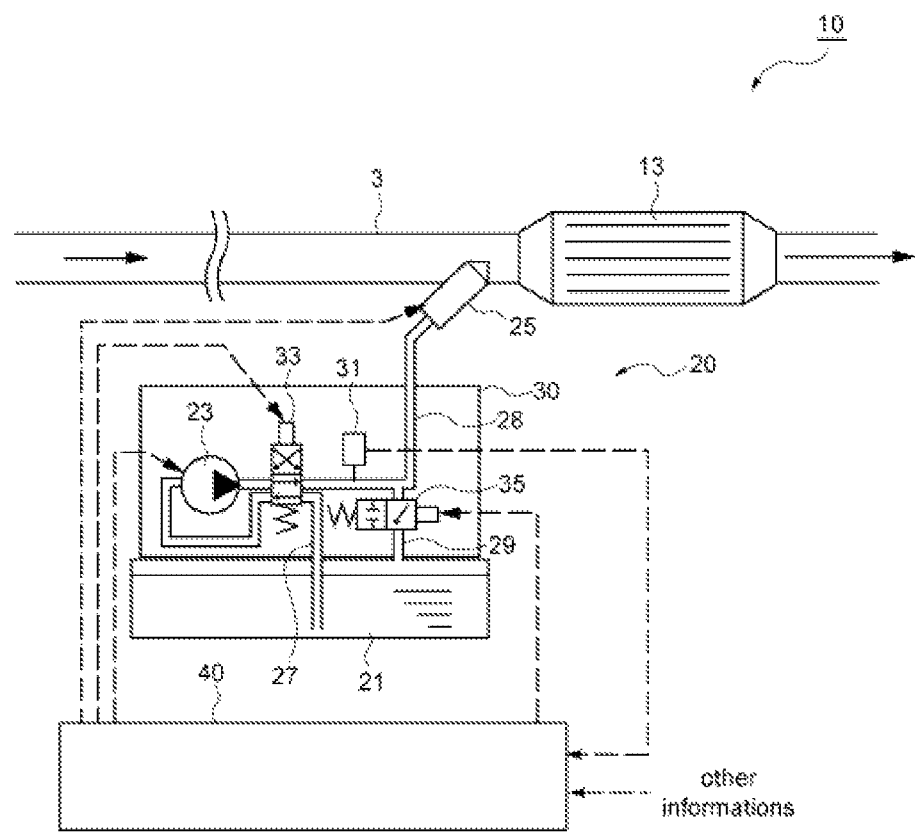
FIG. 1 is a diagram showing a configuration of an exhaust gas purification apparatus including a reducing agent supply apparatus in accordance with a first embodiment of the invention.

Embodiments of a reducing agent supply apparatus and an internal-combustion engine exhaust gas purification apparatus in accordance with the invention are specifically described below based on the drawings.

Unless otherwise specified, through the drawings, like reference numerals denote like components, and their descriptions are appropriately omitted.

First Embodiment

1. Overall Configuration of Exhaust Gas Purification Apparatus

FIG. 1 illustrates a configuration of an exhaust gas purification apparatus 10 including a reducing agent supply apparatus 20 in accordance with a first embodiment of the invention.

In FIG. 1, the exhaust gas purification apparatus 10 is an apparatus for purifying $NO_x$ contained within exhaust gas and is provided on an exhaust gas passageway 3 of an internal-combustion engine, such as an diesel engine, not shown. The exhaust gas purification apparatus 10 includes: an $NO_x$ purification catalyst 13 provided in the middle of the exhaust gas passageway 3; and the reducing agent supply apparatus 20 for supplying liquid reducing agent to within the exhaust gas passageway 3 upstream of the $NO_x$ purification catalyst 13.

The $NO_x$ purification catalyst 13 is a catalyst capable of speeding up decomposition of $NO_x$ contained within exhaust gas. As an $NO_x$ purification catalyst 13, an $NO_x$ selective reduction catalyst, an $NO_x$ adsorber catalyst and the like are generally used. The $NO_x$ selective reduction catalyst is a catalyst that adsorbs reducing agent and selectively reduces incoming $NO_x$ with the reducing agent. In using the $NO_x$ selective reduction catalyst, urea aqueous solution or unburnt fuel (HC) is used as liquid reducing agent.

On the other hand, the $NO_x$ adsorber catalyst is a catalyst that adsorbs NO contained within exhaust gas when the exhaust gas has a lean air-fuel ratio (i.e., in fuel-lean state), and, when the exhaust gas has a rich air-fuel ratio (i.e., in fuel-rich state), discharges $NO_x$ and reduces $NO_x$ contained within exhaust gas with unburnt fuel (HC). In using the $NO_x$ adsorber catalyst, unburnt fuel (HC) is used as liquid reducing agent.

The reducing agent supply apparatus 20 includes: a tank 21 for storing liquid reducing agent; a pump unit 30 for sucking up and pumping liquid reducing agent; and a reducing agent injection valve 25 for injecting the pumped liquid reducing agent to within the exhaust gas passageway 3. The pump unit 30 includes an electromagnetic pump 23, a passage switching valve 33 and a passage throttle valve 35. The reducing agent injection valve 25, the electromagnetic pump 23, the passage switching valve 33 and the passage throttle valve 35 are drive-controlled by an electronic control unit 40.

A first reducing agent supply passage 27 is provided between the tank 21 and the electromagnetic pump 23, while a second reducing agent supply passage 28 is provided between the electromagnetic pump 23 and the reducing agent injection valve 25. Furthermore, a reducing agent return passage 29 is provided branching from the middle of the second reducing agent supply passage 28, the other end of the reducing agent return passage 29 being connected to the tank 21.

A pressure sensor 31 is provided on the second reducing agent supply passage 28 in order to detect the pressure of reducing agent supplied to the reducing agent injection valve 25. While the reducing agent supply apparatus 20 in accordance with the embodiment includes the pressure sensor 31 provided within the pump unit 30, the pressure sensor 31 may be provided anywhere on the second reducing agent supply passage 28.

The passage switching valve 33 is capable of switching the direction in which liquid reducing agent pumped by the electromagnetic pump 23 flows, between a positive direction from the tank 21 side to the reducing agent injection valve 25 side and a negative direction from the reducing agent injection valve 25 side to the tank 21 side. In the reducing agent supply apparatus 20 in accordance with the embodiment, when the passage switching valve 33 is not energized, the passage switching valve 33 causes the first reducing agent supply passage 27 to be in communication with the inlet side of the electromagnetic pump 23 and causes the second reducing agent supply passage 28 to be in communication with the outlet side of the electromagnetic pump 23. On the other hand, when the passage switching valve 33 is energized, the passage switching valve 33 causes the first reducing agent supply passage 27 to be in communication with the outlet side of the electromagnetic pump 23 and causes the second reducing agent supply passage 28 to be in communication with the inlet side of the electromagnetic pump 23.

In other words, when the internal-combustion engine is operating, the electronic control unit 40 stops energizing the passage switching valve 33 to allow liquid reducing agent to be supplied to the reducing agent injection valve 25. On the other hand, when the internal-combustion engine is stopped, the electronic control unit 40 energizes the passage switching valve 33 to allow liquid reducing agent present within the reducing agent supply apparatus 20 to be collected to the tank 21.

Note that the configuration for collecting liquid reducing agent when the internal-combustion engine is stopped is not limited to providing the passage switching valve 33. For example, the liquid reducing agent may be collected by driving the electromagnetic pump 23 in reverse direction.

The electromagnetic pump 23 pumps liquid reducing agent at a predetermined power under the energization control of the electronic control unit 40. In the injection control of liquid reducing agent, the output of the electromagnetic pump 23 is feedback-controlled so that a reducing agent pressure Pu detected by the pressure sensor 31 will be maintained at a predetermined target pressure Pu_tgt. Specifically, in the injection control of liquid reducing agent, the electronic control unit 40 PID-controls the output of the electromagnetic pump 23 based on the difference ΔPu between the reducing agent pressure Pu detected by the pressure sensor 31 and the predetermined target pressure Pu_tgt. In collecting liquid reducing agent, the electronic control unit 40 controls the electromagnetic pump 23 so as to be driven at a predetermined power.

The reducing agent injection valve 25 is caused to open and inject liquid reducing agent to within the exhaust gas passageway 3 through energization control. In the reducing agent supply apparatus 20 in accordance with the embodiment, the electronic control unit 40 determines a target injection amount Qdv_tgt based on a predetermined calculation expression, then determines a drive duty ratio according to the target injection amount Qdv_tgt for each predetermined injection cycle assuming that the reducing agent pressure Pu has reached the target pressure Pu_tgt, and then performs energization control of the reducing agent injection valve 25. In this case, the drive duty ratio corresponds to the operation amount of the reducing agent injection valve 25. The drive duty ratio of the reducing agent injection valve 25 means a percentage of the duration in which the valve is opened within one injection cycle.

The passage throttle valve 35 is an electromagnetic passage throttle valve the opening of which can be adjusted through energization control. In the injection control of liquid reducing agent, the electronic control unit 40 controls the opening of the passage throttle valve 35 according to the change in the drive duty ratio of the reducing agent injection valve 25. Also, in the injection control of liquid reducing agent, the electronic control unit 40 controls the passage throttle valve 35 so as to have a predetermined opening.

Note that the reducing agent supply apparatus 20 in accordance with the embodiment maintains the reducing agent pressure Pu at the target pressure Pu_tgt by controlling the output of the electromagnetic pump 23 while circulating liquid reducing agent via the reducing agent return passage 29. Thus, in the injection control of liquid reducing agent, the passage throttle valve 35 is not completely closed, but is normally opened.

Figure 2:
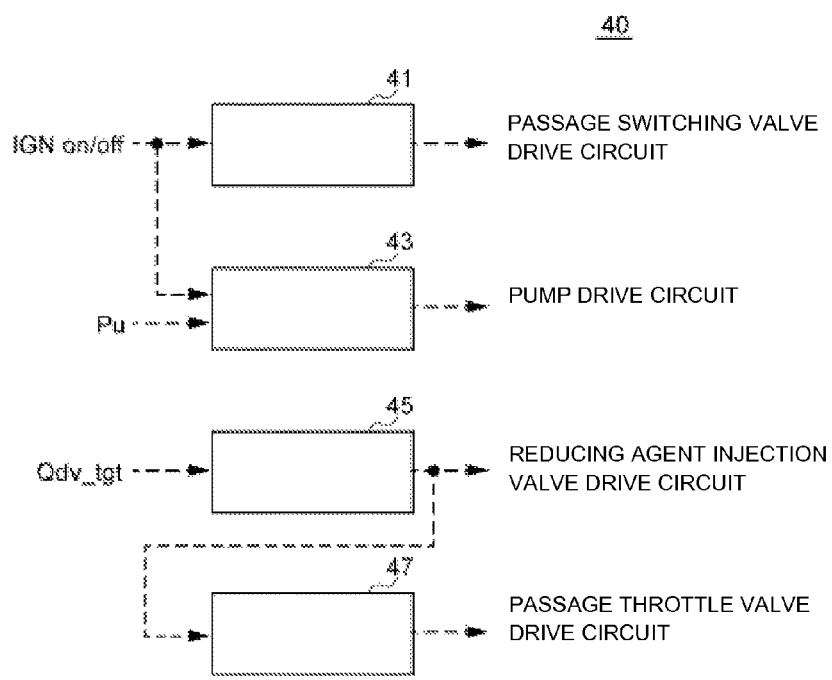
FIG. 2 is a block diagram showing a configuration of an electronic control unit of the reducing agent supply apparatus in accordance with the first embodiment.

FIG. 2 shows a configuration of the electronic control unit 40 in a functional block diagram. The electronic control unit 40 is generally formed of a known microcomputer and includes a passage switching valve control means 41, a pump control means 43, a reducing agent injection valve control means 45 and a passage throttle valve control means 47. Specifically, these means are implemented by execution of a program by the microcomputer.

Also, the electronic control unit 40 includes a storage means (not shown) including a storage device, such as a RAM or ROM. The storage means previously stores a control program and various calculation maps and is configured to store a result of calculation and the like from those means described above.

Among those means, the passage switching valve control means 41, from when the ignition switch of the internal-combustion engine is turned on till when the ignition switch is turned off, stops energizing the passage switching valve 33, and, after the ignition switch is turned off, energizes the passage switching valve 33 only for a predetermined period of time.

The pump control means 43 reads the reducing agent pressure Pu detected by the pressure sensor 31 for each predetermined calculation period, then determines the difference ΔPu between the reducing agent pressure Pu and the predetermined target pressure Pu_tgt, and then PID-controls the output of the electromagnetic pump 23. In this embodiment, the pump control means 43 determines by calculation a drive duty representative of the pump speed as a target output to control the output of the electromagnetic pump 23.

The reducing agent injection valve control means 45 determines the target injection amount Qdv_tgt of liquid reducing agent for each calculation period based on the $NO_x$ flow rate obtained based on an $NO_x$ concentration sensor, the operation state of the internal-combustion engine or the like, the temperature of the $NO_x$ purification catalyst 13 and other information, then controls the drive duty ratio of the reducing agent injection valve 25 based on the target injection amount Qdv_tgt. The drive duty ratio determined at this time is determined based on the target injection amount Qdv_tgt assuming that the pressure of liquid reducing agent supplied to the reducing agent injection valve 25 has reached the target pressure Pu_tgt.

The passage throttle valve control means 47 controls the opening of the passage throttle valve 35 according to the amount of change between the current drive duty ratio of the reducing agent injection valve 25 and the drive duty ratio of the reducing agent injection valve 25 during a calculation period a predetermined number of times earlier. The calculation period a predetermined number of times earlier can be set to an optimum value according to the length of calculation period, the required accuracy of the pressure control and the like. In the reducing agent supply apparatus 20 in accordance with the embodiment, the opening of the passage throttle valve 35 can be switched among three levels. Specifically, the opening can be switched among three levels of a first opening "Open State," a second opening (basic opening) "Default State" and a third opening "Close State," in which these openings are such that: the first opening "Open State">the second opening (basic opening) "Default State">the third opening "Close State">0.

The passage throttle valve control means 47 basically sets the opening of the passage throttle valve 35 to the basic opening "Default State," and, when the drive duty ratio of the reducing agent injection valve 25 significantly increases, temporarily switches the opening to the third opening "Close State" so that decrease in the reducing agent pressure Pu can be suppressed. On the other hand, when the drive duty ratio of the reducing agent injection valve 25 significantly decreases, the passage throttle valve control means 47 temporarily switches the opening to the first opening "Open State" so that increase in the reducing agent pressure Pu can be suppressed.

In the reducing agent supply apparatus 20 in accordance with the embodiment, the storage means stores a first basic map M1 in which the relation between the amount of increase in the drive duty ratio of the reducing agent injection valve 25 and the duration Tbf_close in which the opening of the passage throttle valve 35 is to be maintained at a temporarily decreased opening when the opening of the passage throttle valve 35 is to be switched to the third opening "Close State" is predefined. On the other hand, the storage means stores a second basic map M2 in which the relation between the amount of decrease in the drive duty ratio of the reducing agent injection valve 25 and the duration Tbf_open in which the opening of the passage throttle valve 35 is to be maintained at a temporarily increased opening when the opening of the passage throttle valve 35 is to be switched to the first opening "Open State" is predefined.

These basic maps can be created based on, for example, a result of previously determining through an experiment or the like a duration in which the reducing agent pressure Pu largely deviates from the target pressure Pu_tgt when the drive duty ratio of the reducing agent injection valve 25 is changed while the electromagnetic pump 23 is feedback-controlled. After determining the amount of change in the drive duty ratio of the reducing agent injection valve 25, the passage throttle valve control means 47 further determines a duration in which the opening of the passage throttle valve 35 is to be changed with reference to the first basic map M1 or the second basic map M2 to switch the opening of the passage throttle valve 35.

2. Pressure control of liquid reducing agent

Next, the control performed by the electronic control unit 40 in the reducing agent supply apparatus 20 in accordance with the embodiment in order to maintain the pressure of reducing agent supplied to the reducing agent injection valve 25 at the target pressure Pu_tgt is described below in detail.

(1) Pressure change

Figure 3:
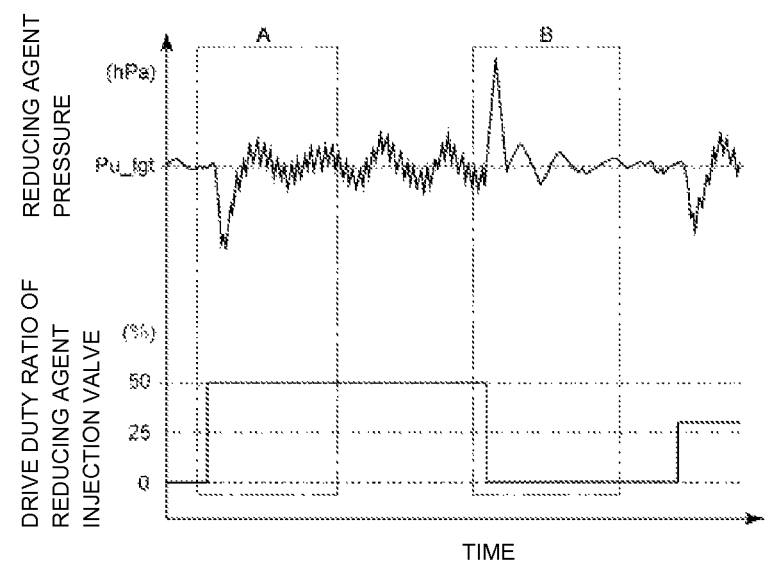
FIG. 3 is a diagram showing how the reducing agent pressure changes when controlled only by feedback-controlling the electromagnetic pump.
Figure 4:
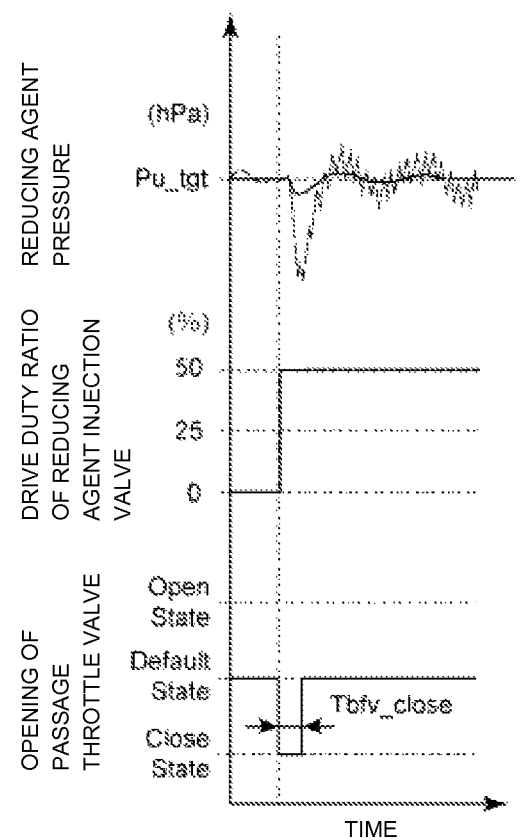
FIG. 4 is a diagram showing how the reducing agent pressure changes when controlled by controlling the opening of a passage throttle valve in conjunction with feedback-controlling the electromagnetic pump.
Figure 5:
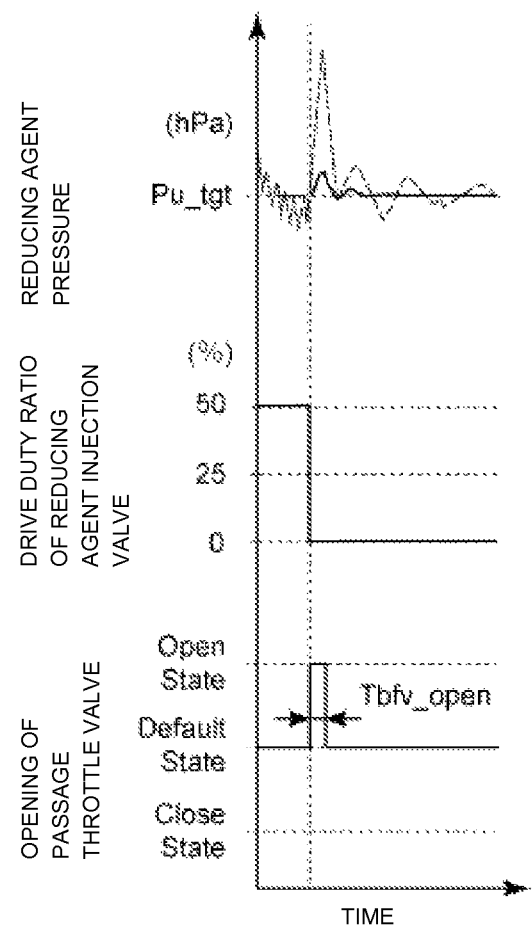
FIG. 5. is a diagram showing how the reducing agent pressure changes when controlled by controlling the opening of a passage throttle valve in conjunction with feedback-controlling the electromagnetic pump.

FIG. 3 shows how the reducing agent pressure Pu changes when controlled only by feedback-controlling the electromagnetic pump 23 against the changing drive duty ratio of the reducing agent injection valve 25. FIGS. 4 and 5 show how the reducing agent pressure Pu changes when controlled by controlling the opening of the passage throttle valve 35 in conjunction with feedback-controlling the electromagnetic pump 23. FIG. 4 corresponds to a period of section A enclosed by an alternate long and short dash line in FIG. 3. FIG. 5 corresponds to a period of section B enclosed by an alternate long and two short dashes line in FIG. 3.

As shown in FIG. 3, with the reducing agent pressure Pu controlled only by feedback-controlling the electromagnetic pump 23, when the drive duty ratio of the reducing agent injection valve 25 sharply increases from 0% to 50% (section A) and sharply decreases from 50% to 0% (section B), the immediate reducing agent pressure Pu largely deviates from the target pressure Pu_tgt. Also, when the drive duty ratio of the reducing agent injection valve 25 sharply increases from 0% to 50% (section A), the reducing agent pressure Pu largely deviates from the target pressure Pu_tgt, then oscillates around the target pressure Pu_tgt without attenuation.

On the other hand, as shown in FIG. 4, with the reducing agent pressure Pu controlled by controlling the opening of the passage throttle valve 35 in conjunction with feedback-controlling the electromagnetic pump 23, when the drive duty ratio of the reducing agent injection valve 25 sharply increases from 0% to 50%, the opening of the passage throttle valve 35 is switched to the third opening "Close State" for a duration Tbfv_close. As a result, decrease in the pressure within the second reducing agent supply passage 28 is suppressed, preventing the reducing agent pressure Pu from largely deviating from the target pressure Pu_tgt. Furthermore, after that, the reducing agent pressure Pu quickly decays to the target pressure Pu_tgt.

On the other hand, as shown in FIG. 5, with the reducing agent pressure Pu controlled by controlling the opening of the passage throttle valve 35 in conjunction with feedback-controlling the electromagnetic pump 23, when the drive duty ratio of the reducing agent injection valve 25 sharply decreases from 50% to 0%, the opening of the passage throttle valve 35 is switched to the first opening "Open State" for a duration Tbfv_open. As a result, increase in the pressure within the second reducing agent supply passage 28 is suppressed, preventing the reducing agent pressure Pu from largely deviating from the target pressure Pu_tgt.

(2) Flowchart

An example of a method for controlling the passage throttle valve 35 is specifically described below with reference to the flowcharts shown in FIGS. 6-8, the method being performed by the electronic control unit 40 included in the reducing agent supply apparatus 20 in accordance with the embodiment. The routine described below is normally performed while the internal-combustion engine is operating.

Note that, although not shown in the flowcharts described below, feedback-control of the output of the electromagnetic pump 23 is performed in parallel to controlling the passage throttle valve 35.

First, the electronic control unit 40, in step S11 in FIG. 6, starts injection control of liquid reducing agent, then in step S12, sets the opening of the passage throttle valve 35 to the second opening (basic opening) "Default State," and then in step S13, starts controlling the passage throttle valve 35.

Then, the electronic control unit 40, in step S14, calculates the difference ΔDVduty between the current drive duty ratio of the reducing agent injection valve 25 and the drive duty ratio during a calculation period a predetermined number of times earlier, then in step S15, determines whether or not the difference ΔDVduty between the drive duty ratios is less than a preset upper limit threshold. The upper limit threshold is a threshold for determining a state in which the injection amount of liquid reducing agent is likely to sharply increase, thereby significantly decreasing the reducing agent pressure Pu, and is set to an appropriate value considering a required accuracy of the pressure control and the like.

If determined in the step S15 that the difference ΔDVduty is equal to or more than the upper limit threshold (determined No), the electronic control unit 40 proceeds to step S17 to performs a control for further decreasing the opening of the passage throttle valve 35 in order to prevent the reducing agent pressure Pu from decreasing, then returns to the step S13.

Figure 7:
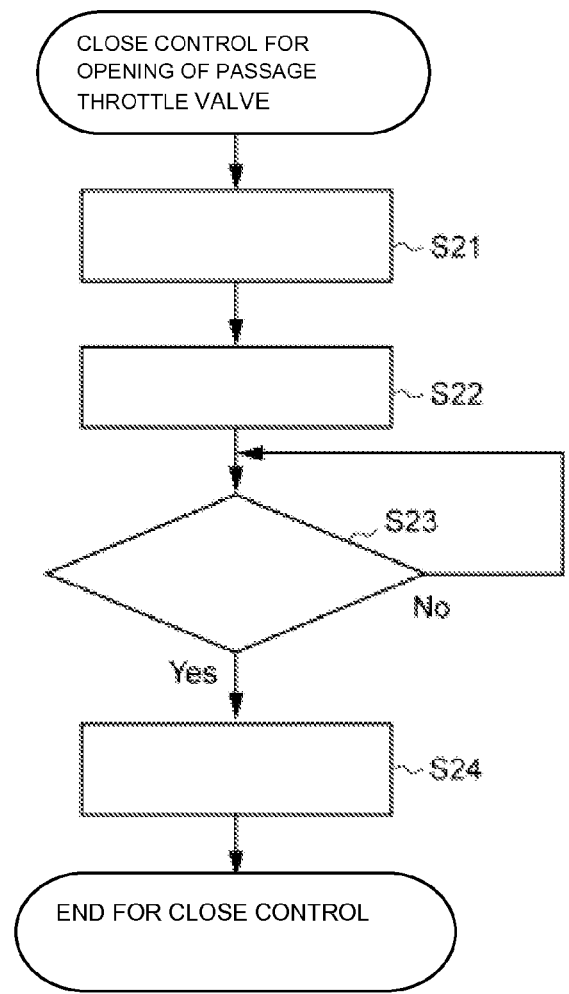
FIG. 7. is a flowchart illustrating an example of a control for decreasing the opening of the passage throttle valve in the reducing agent supply apparatus in accordance with the first embodiment.

FIG. 7 is a flowchart specifically showing an example of a control for decreasing the opening of the passage throttle valve 35 performed in the step S17. In this example, first, in step S21, the electronic control unit 40 sets the opening of the passage throttle valve 35 to the third opening "Close State." Then, in step S22, the electronic control unit 40, based on the difference ΔDVduty between the drive duty ratios of the reducing agent injection valve 25, determines, from the above-described first basic map M1, the duration Tbfv_close in which the opening is to be maintained at the third opening "Close State" and sets the determined duration Tbfv_close.

Then, in step S23, the electronic control unit 40 determines whether or not the time T elapsed from the start of the control for decreasing the opening of the passage throttle valve 35 has reached the duration Tbfv_close. The step S23 is repeated until the elapsed time T reaches the duration Tbfv_close. When the elapsed time T reaches the duration Tbfv_close, the electronic control unit 40 proceeds to step S24 to reset the opening of the passage throttle valve 35 to the second opening (basic opening) "Default State," then ends the control for decreasing the opening of the passage throttle valve 35.

Returning to FIG. 6, if determined in the step S15 that the difference ΔDVduty is less than the upper limit threshold (determined Yes), the electronic control unit 40 proceeds to step S16 to determine whether or not the difference ΔDVduty is more than a lower limit threshold. The lower limit threshold is a threshold for determining a state in which the injection amount of liquid reducing agent is likely to sharply decrease, thereby significantly increasing the reducing agent pressure Pu, and is set to an appropriate value considering a required accuracy of the pressure control and the like.

If determined in the step S16 that the difference ΔDVduty is equal to or less than the lower limit threshold (determined No), the electronic control unit 40 proceeds to step S18 to perform a control for increasing the opening of the passage throttle valve 35 in order to prevent the reducing agent pressure Pu from increasing, then returns to the step S13.

Figure 8:
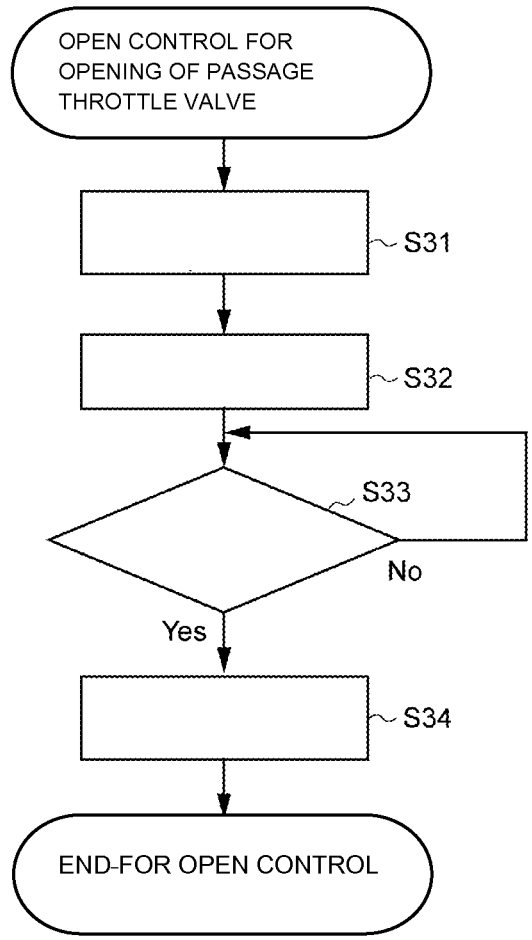
FIG. 8. is a flowchart illustrating an example of a control for increasing the opening of the passage throttle valve in the reducing agent supply apparatus in accordance with the first embodiment.

FIG. 8 is a flowchart specifically showing an example of a control for increasing the opening of the passage throttle valve 35 performed in the step S18. In this example, first, in step S31, the electronic control unit 40 sets the opening of the passage throttle valve 35 to the first opening "Open State." Then, in step S32, the electronic control unit 40, based on the difference ΔDVduty between the drive duty ratios of the reducing agent injection valve 25, determines, from the above-described second basic map M2, the duration Tbfv_open in which the opening is to be maintained at the first opening "Open State" and sets the determined duration Tbfv_open.

Then, in step S33, the electronic control unit 40 determines whether or not the time T elapsed from the start of the control for increasing the opening of the passage throttle valve 35 has reached the duration Tbfv_open. The step S33 is repeated until the elapsed time T reaches the duration Tbfv_open. When the elapsed time T reaches the duration Tbfv_open, the electronic control unit 40 proceeds to step S34 to reset the opening of the passage throttle valve 35 to the second opening (basic opening) "Default State," then ends the control for increasing the opening of the passage throttle valve 35.

Returning to FIG. 6, if determined in the step S16 that the difference ΔDVduty is more than the lower limit threshold, the difference ΔDVduty between the drive duty ratios of the reducing agent injection valve 25 is within a predetermined range (the lower limit threshold<ΔDVduty<the upper threshold), and the reducing agent pressure Pu is not likely to largely deviate from the target pressure Pu_tgt, so the electronic control unit 40 returns to the step S13 without any particular action. After that, similar calculations are repeated according to the steps described above.

3. Effect of First Embodiment

The reducing agent supply apparatus 20 in accordance with the first embodiment of the invention described above is configured to adjust the opening of the passage throttle valve 35 provided in the middle of the reducing agent return passage 29 according to the difference ΔDVduty between the drive duty ratios of the reducing agent injection valve 25 in conjunction with feedback-controlling the output of the electromagnetic pump 23, which can reduce the state of large deviation of the reducing agent pressure Pu from the target pressure Pu_tgt. Consequently, controlling the reducing agent injection valve 25 assuming that the reducing agent pressure Pu has reached the target pressure Pu_tgt causes liquid reducing agent to be injected into within the exhaust gas passageway 3 in just proportion. Furthermore, when various diagnostic controls using the reducing agent pressure Pu, such as diagnosing clogging of the reducing agent injection valve 25, are performed, decrease in the diagnostic accuracy can be prevented. This can enable the exhaust gas purification apparatus 10 that can precisely perform exhaust gas purification control to be provided.

Furthermore, according to the reducing agent supply apparatus 20 in accordance with the first embodiment, the passage throttle valve control means 47 of the electronic control unit 40 is configured to: normally opens the passage throttle valve 35 at the second opening (basic opening) "Default State"; when the drive duty ratio of the reducing agent injection valve 25 sharply increases, sets the opening of the passage throttle valve 35 to the third opening "Close State" to temporarily decrease the opening; and, when the drive duty ratio of the reducing agent injection valve 25 sharply decreases, sets the opening of the passage throttle valve 35 to the first opening "Open State" to temporarily increase the opening. Thus, in response to significant increase or decrease in the injection amount of liquid reducing agent, the return flow rate in the reducing agent return passage 29 is changed, which can prevent the reducing agent pressure Pu from largely deviating from the target pressure Pu_tgt.

Furthermore, according to the reducing agent supply apparatus 20 in accordance with the first embodiment, the passage throttle valve control means 47 of the electronic control unit 40 is configured to control the opening of the passage throttle valve 35 with a duration varied according to the change in the drive duty ratio of the reducing agent injection valve 25. This allows the use of the passage throttle valve 35 having a relatively simple configuration, improving the accuracy of the pressure control while saving the cost.

Second Embodiment

A reducing agent supply apparatus in accordance with a second embodiment of the invention has a basic configuration similar to that of the reducing agent supply apparatus in accordance with the first embodiment, while having an electronic control unit that performs control in a different way from that of the reducing agent supply apparatus in accordance with the first embodiment. Now, the reducing agent supply apparatus in accordance with this embodiment is described with reference to FIG. 1 for the basic configuration and using the reference numerals used in FIG. 1 for the components but the electronic control unit.

1. Configuration of Electronic Control Unit

In the reducing agent supply apparatus in accordance with the embodiment, the electronic control unit is configured to be capable of correcting the durations Tbfv_close and Tbfv_open for temporarily decreasing or increasing the opening of the passage throttle valve 35 so that the control of the reducing agent pressure Pu will be maintained in an optimal state, considering time degradation, manufacturing tolerance of the components and the like.

Figure 9:
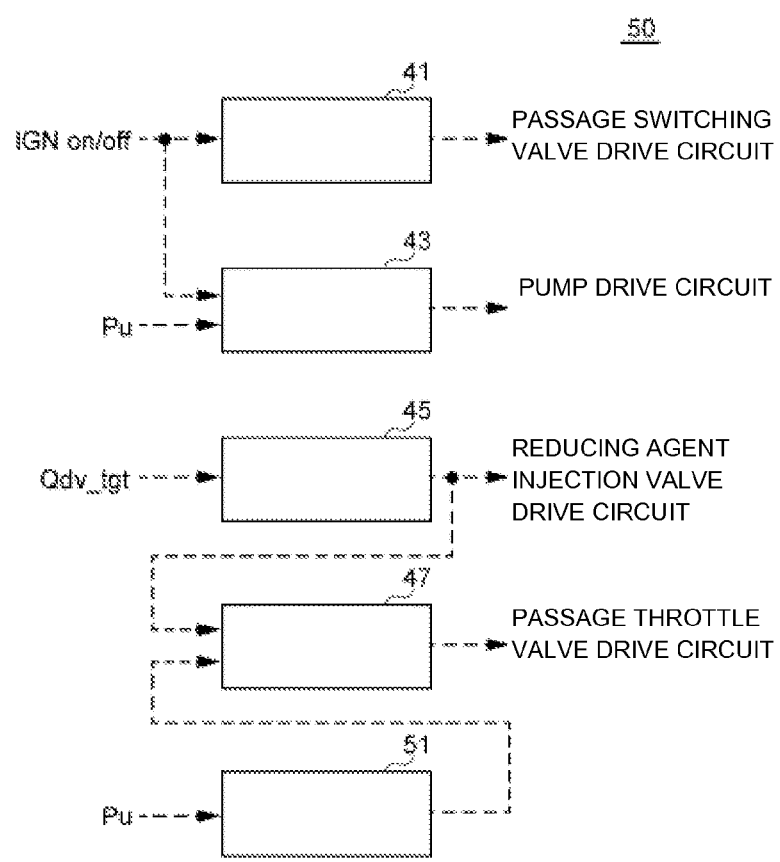
FIG. 9 is a block diagram showing a configuration of an electronic control unit of the reducing agent supply apparatus in accordance with a second embodiment.

FIG. 9 is a functional block diagram showing a configuration of an electronic control unit 50 included in the reducing agent supply apparatus in accordance with the embodiment. The electronic control unit 50 is generally formed of a known microcomputer and includes a passage switching valve control means 41, a pump control means 43, a reducing agent injection valve control means 45, a passage throttle valve control means 47 and a correction means 51. Specifically, these means are implemented by execution of a program by the microcomputer.

Also, the electronic control unit 50 includes a storage means (not shown) including a storage device, such as a RAM or ROM. The storage means previously stores a control program and various calculation maps and is configured to store a result of calculation and the like from those means described above.

Among these means, the passage switching valve control means 41, the pump control means 43, the reducing agent injection valve control means 45 and the passage throttle valve control means 47 can be configured in the same way as those of the reducing agent supply apparatus in accordance with the first embodiment, so their detailed descriptions are omitted.

When the opening of the passage throttle valve 35 is further decreased or increased, causing the maximum or minimum value of the reducing agent pressure Pu to depart from a tolerance range, the correction means 51 afterwards corrects the duration Tbfv_close, Tbfv_open in which the opening is to be changed.

2. Flowchart

The basic routine of a method for controlling the passage throttle valve performed in the reducing agent supply apparatus in accordance with this embodiment is performed according to the flowchart shown in FIG. 6 as with the reducing agent supply apparatus in accordance with first embodiment. However, step S17 of a control for further decreasing the opening of the passage throttle valve 35 and step S18 of a control for increasing the opening of the passage throttle valve 35 are different from those for the reducing agent supply apparatus in accordance with the first embodiment.

Figure 10:
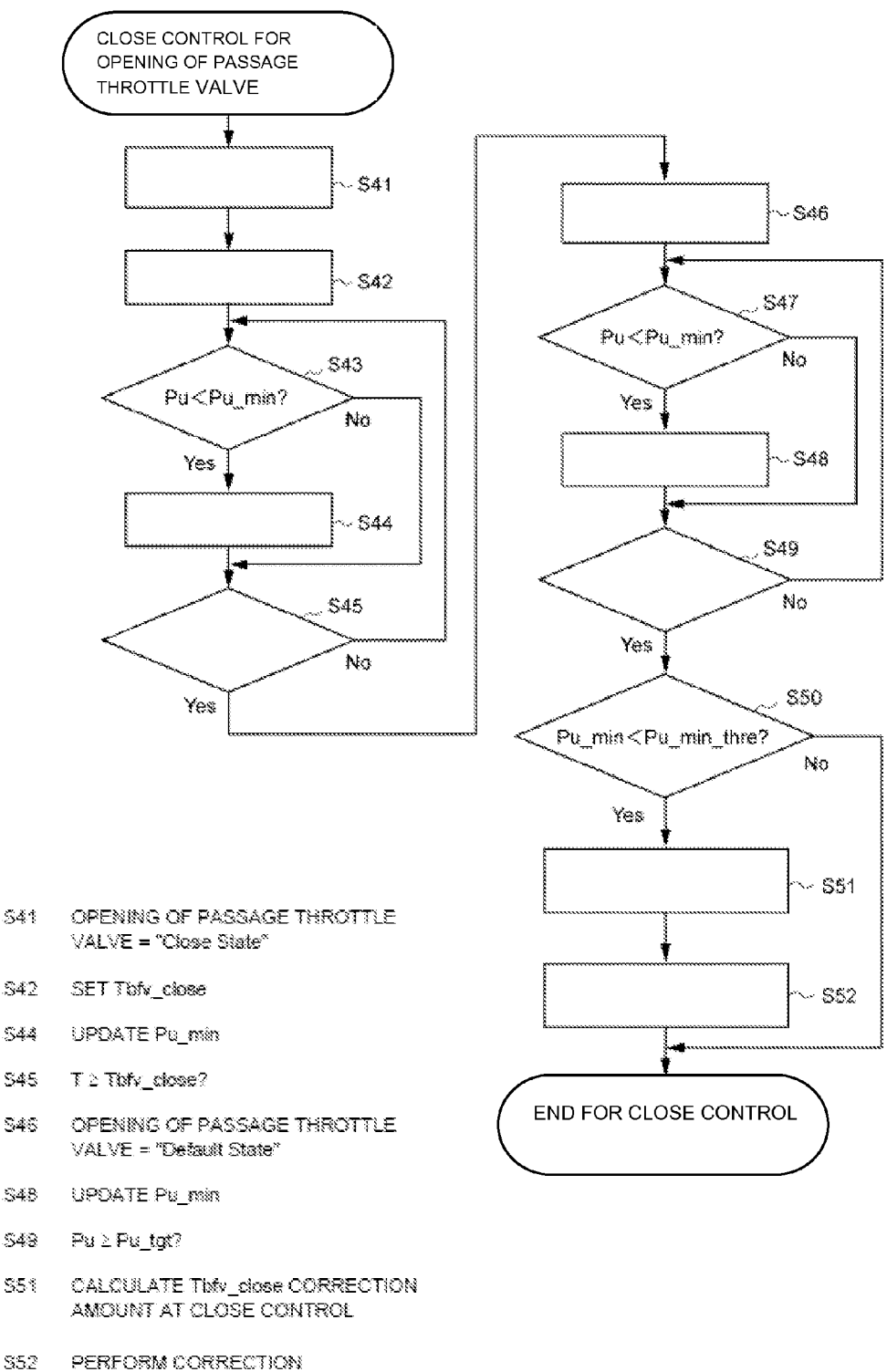
FIG. 10 is a flowchart illustrating an example of a control for decreasing the opening of the passage throttle valve in the reducing agent supply apparatus in accordance with the second embodiment.

First, an example of a control for further decreasing the opening of the passage throttle valve 35 performed in the reducing agent supply apparatus in accordance with the embodiment is specifically described with reference to a flowchart shown in FIG. 10.

In this example, first, in step S41, the electronic control unit 50 sets the opening of the passage throttle valve 35 to the third opening "Close State." Then, in step S42, the electronic control unit 50, based on the difference ΔDVduty between the drive duty ratios of the reducing agent injection valve 25, determines, based on the above-described first basic map M1 and the correction amount at this time, the duration Tbfv_close in which the opening is to be maintained at the third opening "Close State" and sets the determined duration Tbfv_close.

Then, in step S43, the electronic control unit 50 determines whether or not the reducing agent pressure Pu detected by the pressure sensor 31 is less than a minimum pressure value Pu_min. The minimum pressure value Pu_min is updated each time the reducing agent pressure Pu reaches a new minimum value after the control for decreasing the opening of the passage throttle valve 35 is started at this time. If determined in the step S43 that the reducing agent pressure Pu is equal to or more than a stored minimum pressure value Pu_min (determined No), the electronic control unit 50 proceeds to step S45. On the other hand, if determined that the reducing agent pressure Pu is less than the stored minimum pressure value Pu_min (determined Yes), the electronic control unit 50 proceeds to step S44 to update the minimum pressure value Pu_min to the current reducing agent pressure Pu and then proceeds to the step S45.

Then, in the step S45, the electronic control unit 50 determines whether or not the time T elapsed from the start of the control for decreasing the opening of the passage throttle valve 35 has reached the duration Tbfv_close. If determined in the step S45 that the elapsed time T has not reached the duration Tbfv_close (determined No), the electronic control unit 50 returns to the step S43 and repeats the steps S43 to S45 until the elapsed time T reaches the duration Tbfv_close.

On the other hand, if determined in the step S45 that the elapsed time T has reached the duration Tbfv_close (determined Yes), the electronic control unit 50 proceeds to step S46 to return the opening of the passage throttle valve 35 to the second opening (basic opening) "Default State." Then, in steps S47 to S48, updating of the minimum pressure value Pu_min is continued in a similar way to the steps S43 to S44. Updating of the minimum pressure value Pu_min is repeated until it is determined in step S49 that the reducing agent pressure Pu is equal to or more than the target pressure Pu_tgt (determined Yes).

Then, if determined in the step S49 that the reducing agent pressure Pu is equal to or more than the target pressure Pu_tgt, the electronic control unit 50 proceeds to step S50 to determine whether or not the stored minimum pressure value Pu_min is less than a lower limit threshold pressure value Pu_min_thre. The lower limit threshold pressure value Pu_min_thre defines a tolerance range for the reducing agent pressure Pu largely deviating from the target pressure Pu_tgt and decreasing, and is set to an optimal value considering tolerance of the pressure control and the like.

If determined in the step S50 that the stored minimum pressure value Pu_min is equal to or more than the lower limit threshold pressure value Pu_min_thre (determined No), the pressure control is considered to be effectively functioning at a current setting, so the control for decreasing the opening of the passage throttle valve 35 is ended without any particular action. On the other hand, if determined in the step S50 that the stored minimum pressure value Pu_min is less than the lower limit threshold pressure value Pu_min_thre (determined Yes), the electronic control unit 50 proceeds to step S51 to determine a correction amount of the duration Tbfv_close for performing the control for decreasing the opening of the passage throttle valve 35.

In this case, since even decreasing the opening of the passage throttle valve 35 with the duration Tbfv_close determined from the current setting has been unable to suppress the decrease in the reducing agent pressure Pu, a correction of the duration Tbfv_close is performed to extend the duration Tbfv_close.

The correction amount may be determined in any appropriate form, such as a coefficient (>0) to be multiplied by the duration Tbfv_close determined from the first basic map M1 or a value to be added to the duration Tbfv_close determined from the first basic map M1. Also, the correction amount may be determined according to the difference ΔPu_min between the stored minimum pressure value Pu_min and the lower limit threshold pressure value Pu_min_thre or may be gradually incremented by a predetermined amount.

After the correction amount is determined in the step S51, in step S52, the electronic control unit 50 performs the correction so that the correction amount will be reflected in the calculation of the duration Tbfv_close. With this, the electronic control unit 50 ends the control for decreasing the opening of the passage throttle valve 35.

Figure 11:
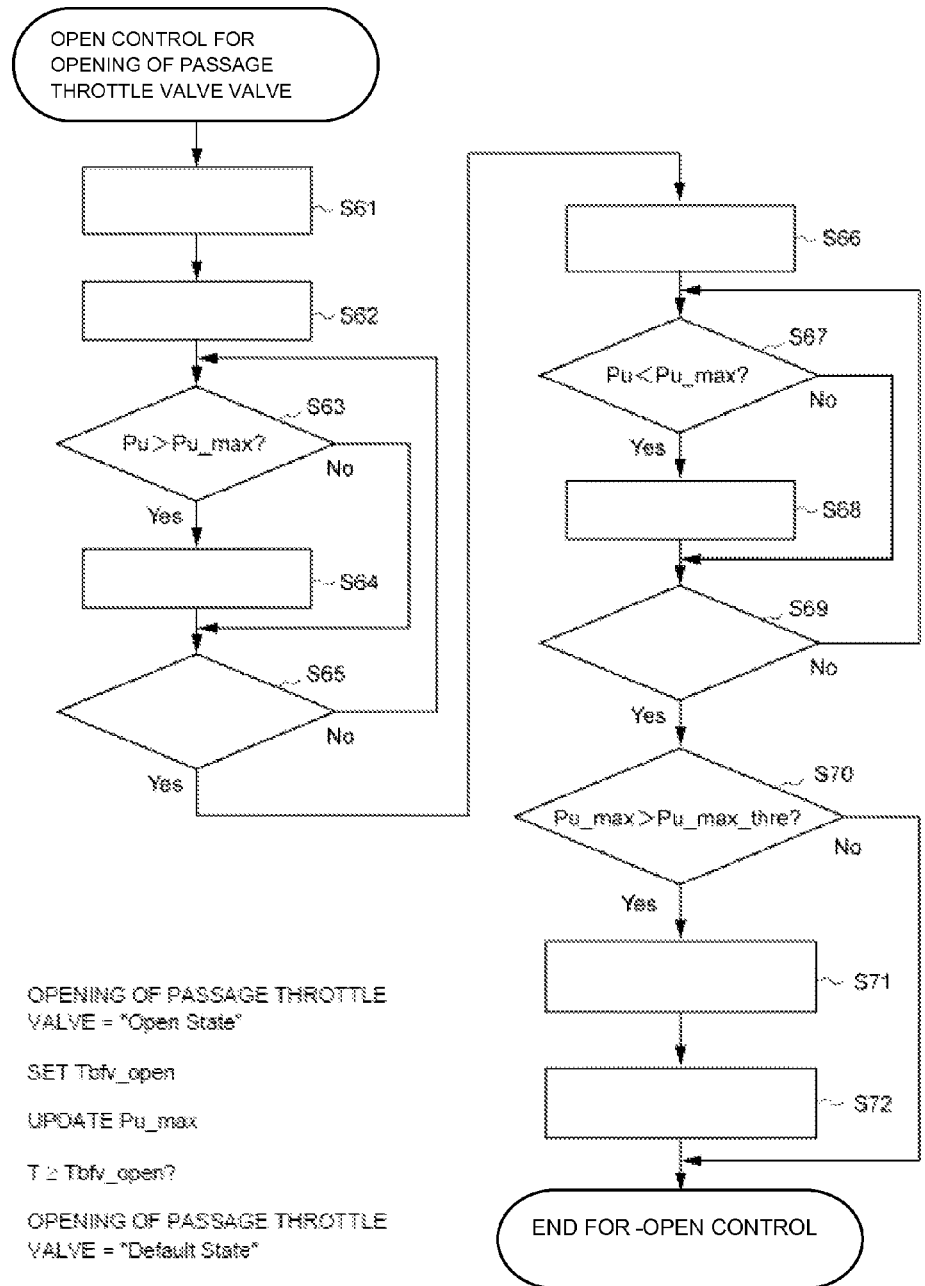
FIG. 11 is a flowchart illustrating an example of a control for increasing the opening of the passage throttle valve in the reducing agent supply apparatus in accordance with the second embodiment.

Next, an example of a control for increasing the opening of the passage throttle valve 35 performed in the reducing agent supply apparatus in accordance with the embodiment is specifically described with reference to a flowchart shown in FIG. 11.

In this example, first, in step S61, the electronic control unit 50 sets the opening of the passage throttle valve 35 to the first opening "Open State." Then, in step S62, the electronic control unit 50, based on the difference ΔDVduty between the drive duty ratios of the reducing agent injection valve 25, determines, based on the above-described second basic map M2 and the correction amount at this time, the duration Tbfv_open in which the opening is to be maintained at the first opening "Open State" and sets the determined duration Tbfv_Open.

Then, in step S63, the electronic control unit 50 determines whether or not the reducing agent pressure Pu detected by the pressure sensor 31 is more than a maximum pressure value Pu_max. The maximum pressure value Pu_max is updated each time the reducing agent pressure Pu reaches a new maximum value after the control for increasing the opening of the passage throttle valve 35 is started at this time. If determined in the step S63 that the reducing agent pressure Pu is equal to or less than a stored maximum pressure value Pu_max (determined No), the electronic control unit 50 proceeds to step S65. On the other hand, if determined that the reducing agent pressure Pu is more than the stored maximum pressure value Pu_max (determined Yes), the electronic control unit 50 proceeds to step S64 to update the maximum pressure value Pu_max to the current reducing agent pressure Pu and then proceeds to the step S65.

Then, in the step S65, the electronic control unit 50 determines whether or not the time T elapsed from the start of the control for increasing the opening of the passage throttle valve 35 has reached the duration Tbfv_open. If determined in the step S65 that the elapsed time T has not reached the duration Tbfv_open (determined No), the electronic control unit 50 returns to the step S63 and repeats the steps S63 to S65 until the elapsed time T reaches the duration Tbfv_open.

On the other hand, if determined in the step S65 that the elapsed time T has reached the duration Tbfv_open (determined Yes), the electronic control unit 50 proceeds to step S66 to return the opening of the passage throttle valve 35 to the second opening (basic opening) "Default State." Then, in steps S67 to S68, updating of the maximum pressure value Pu_max is continued in a similar way to the steps S63 to S64. Updating of the maximum pressure value Pu_max is repeated until it is determined in step S69 that the reducing agent pressure Pu is equal to or less than the target pressure Pu_tgt (determined Yes).

Then, if determined in the step S69 that the reducing agent pressure Pu is equal to or less than the target pressure Pu_tgt, the electronic control unit 50 proceeds to step S70 to determine whether or not the stored maximum pressure value Pu_max is more than a upper limit threshold pressure value Pu_max_thre. The upper limit threshold pressure value Pu_max_thre defines a tolerance range for the reducing agent pressure Pu largely deviating from the target pressure Pu_tgt and increasing, and is set to an optimal value considering tolerance of the pressure control and the like.

If determined in the step S70 that the stored maximum pressure value Pu_max is equal to or less than the upper limit threshold pressure value Pu_max_thre (determined No), the pressure control is considered to be effectively functioning at a current setting, so the control for decreasing the opening of the passage throttle valve 35 is ended without any particular action. On the other hand, if determined in the step S70 that the stored maximum pressure value Pu_max is more than the upper limit threshold pressure value Pu_max_thre (determined Yes), the electronic control unit 50 proceeds to step S71 to determine a correction amount of the duration Tbfv_open for performing the control for increasing the opening of the passage throttle valve 35.

In this case, since even increasing the opening of the passage throttle valve 35 with the duration Tbfv_open determined from the current setting has been unable to suppress the increase in the reducing agent pressure Pu, a correction of the duration Tbfv_open is performed to extend the duration Tbfv_open.

The correction amount may be determined in any appropriate form, such as a coefficient (>0) to be multiplied by the duration Tbfv_open determined from the second basic map M2 or a value to be added to the duration Tbfv_open determined from the second basic map M2. Also, the correction amount may be determined according to the difference ΔPu_max between the stored maximum pressure value Pu_max and the upper limit threshold pressure value Pu_max_thre or may be gradually incremented by a predetermined amount.

After the correction amount is determined in the step S71, in step S72, the electronic control unit 50 performs the correction so that the correction amount will be reflected in the calculation of the duration Tbfv_open. With this, the electronic control unit 50 ends the control for increasing the opening of the passage throttle valve 35.

3. Effect of Second Embodiment

For the reducing agent supply apparatus in accordance with the second embodiment of the invention described above, the same effect as that of the reducing agent supply apparatus 20 in accordance with the first embodiment can be achieved, and in addition, the durations Tbfv_close and Tbfv_open in which the opening of the passage throttle valve 35 is to be changed are corrected according to the state of the difference between the reducing agent pressure Pu and the target pressure Pu_tgt as a result of changing the opening of the passage throttle valve 35, which can prevent the reducing agent pressure Pu from largely deviating from the target pressure Pu_tgt for a long period of time. Thus, even with individual variability or time degradation in the reducing agent supply apparatus, the exhaust gas purification apparatus that can precisely perform exhaust gas purification control for a long period can be provided.

Third Embodiment

A reducing agent supply apparatus in accordance with a third embodiment of the invention has a basic configuration similar to that of the reducing agent supply apparatus in accordance with the first or second embodiment, and is further configured to perform control of the passage throttle valve and control of the passage switching valve through one harness.

Figure 12:
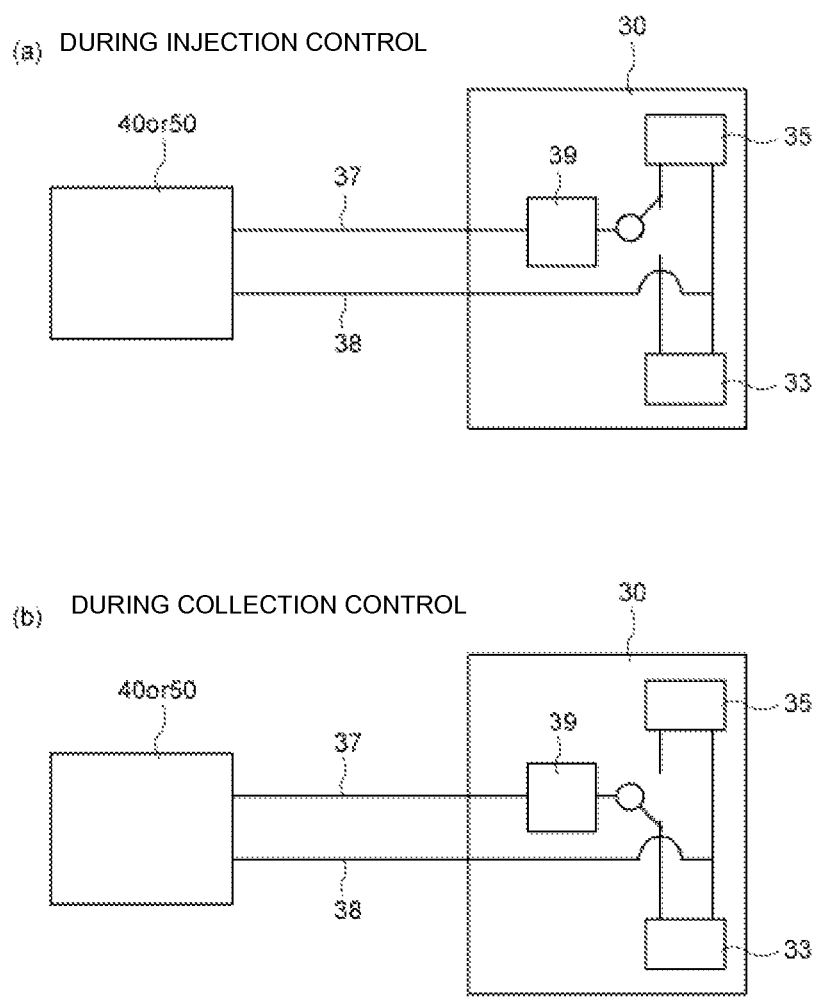
FIG. 12 is an electric circuit diagram of a reducing agent supply apparatus in accordance with a third embodiment.
Figure 13:
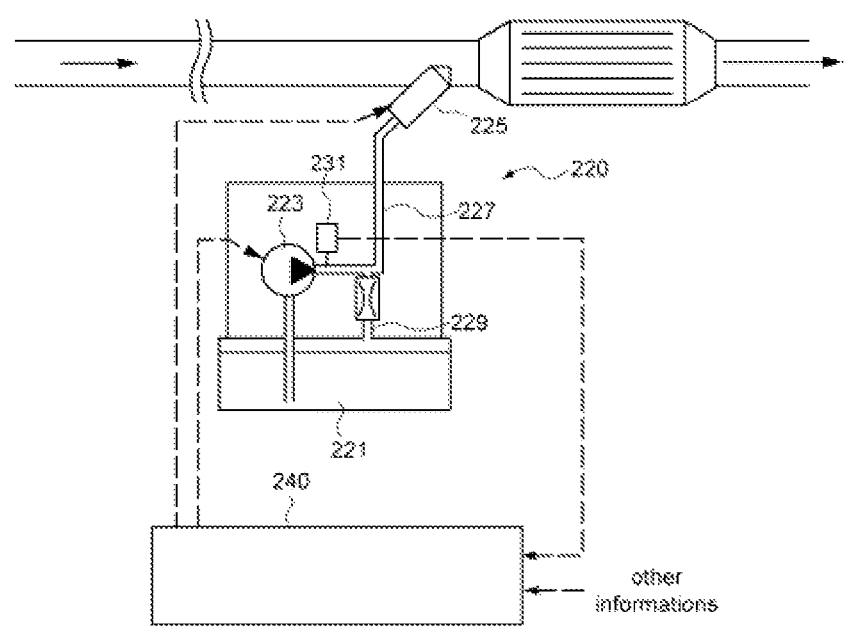
FIG. 13 is a diagram showing a configuration of an exhaust gas purification apparatus including a conventional reducing agent supply apparatus.

FIGS. 12(a) and 12(b) schematically show an electric circuit that connects the electronic control unit 40 or 50, the passage switching valve 33 and the passage throttle valve 35 in the reducing agent supply apparatus in accordance with this embodiment. Among them, FIG. 12(a) shows a situation in which the injection control of liquid reducing agent is being performed, and FIG. 12(b) shows a situation in which the collection control of liquid reducing agent is being performed.

A signal line 37 and a ground line 38 are placed between the electronic control unit 40 or 50 and the pump unit 30. A switch driver 39 is provided in the middle of the signal line 37 and is configured to be capable of switching the connection of the signal line 37 between the passage switching valve 33 and the passage throttle valve 35.

As shown in FIG. 12(a), while the injection control of liquid reducing agent is being performed, the signal line 37 is connected to the passage throttle valve 35, so the passage throttle valve 35 can be controlled by the electronic control unit 40 or 50. On the other hand, as shown in FIG. 12(b), while the collection control of liquid reducing agent is being performed, the signal line 37 is connected to the passage switching valve 33, so the passage switching valve 33 can be controlled by the electronic control unit 40 or 50.

In the reducing agent supply apparatus in accordance with the embodiment, the passage switching valve 33 is used to: when not energized, causes the first reducing agent supply passage 27 to be in communication with the inlet side of the electromagnetic pump 23 and causes the second reducing agent supply passage 28 to be in communication with the outlet side of the electromagnetic pump 23; and, when energized, causes the first reducing agent supply passage 27 to be in communication with the outlet side of the electromagnetic pump 23 and causes the second reducing agent supply passage 28 to be in communication with the inlet side of the electromagnetic pump 23. Since the passage switching valve 33 only needs to be connected to the signal line 37 while the collection control of liquid reducing agent is being performed when the internal-combustion engine is stopped, the passage switching valve 33 is not controlled at the same time as the passage throttle valve 35 that is controlled while the injection control of liquid reducing agent is being performed.

Accordingly, when the passage throttle valve 35 is provided in the middle of the reducing agent return passage 29, a harness for communicating a signal to the passage switching valve 33 can be used to communicate a signal to the passage throttle valve 35, which eliminates the need for an additional harness. For the reducing agent supply apparatus in accordance with the embodiment, the same effect as that of the reducing agent supply apparatus in accordance with the first and second embodiments can be achieved, and in addition, the cost can be saved.

Other Embodiment

The reducing agent supply apparatus and the exhaust gas purification apparatus in accordance with the first to third embodiments as described above represent one aspect of the invention and do not limit the invention, so the embodiments can be modified in any appropriate manner within the scope of the invention. For example, the reducing agent supply apparatus and the exhaust gas purification apparatus in accordance with the first to third embodiments can be modified as follows.

(1) The components of the reducing agent supply apparatus 20 and the exhaust gas purification apparatus 10, and the setting and setting condition of the electronic control unit 40 or 50 described for the first to third embodiments are only an example and can be modified in any appropriate manner.

(2) The reducing agent supply apparatus 20 and the exhaust gas purification apparatus 10 in accordance with the first to third embodiments are configured to change the opening of the passage throttle valve 35 with the durations Tbfv_close and Tbfv_open varied according to the difference ΔDVduty of the drive duty ratios of the reducing agent injection valve 25 using the first basic map M1 and the second basic map M2, but may be configured to vary the opening of the passage throttle valve 35 according to the difference ΔDVduty of the drive duty ratios of the reducing agent injection valve 25 with a constant duration. Alternatively, both the duration and the opening may be varied according to the ΔDVduty of the drive duty ratios of the reducing agent injection valve 25. Also in controlling in this way, a configuration of correcting a subsequent duration or opening according to the result of changing the opening of the passage throttle valve 35 is preferable.

(3) The reducing agent supply apparatus and the exhaust gas purification apparatus in accordance with the third embodiment is configured to use the first basic map M1 and the second basic map M2 as they are and additionally use as a correction amount a coefficient to be multiplied by or a value to be added to the durations Tbfv_close and Tbfv_open to correct the durations Tbfv_close and Tbfv_open. However, any appropriate correction method other than the above methods can be used. For example, with a plurality of maps for further decreasing the opening of the passage throttle valve 35 and a plurality of maps for increasing the opening of the passage throttle valve 35 prepared, the correction can be performed by selecting a map to be used from the maps.

The invention claimed is:

1. A reducing agent supply apparatus comprising: a pump for sucking up and pumping liquid reducing agent stored in a tank; a reducing agent injection valve for injecting the liquid reducing agent to within an exhaust gas passageway of an internal-combustion engine; a reducing agent supply passage for guiding the liquid reducing agent pumped from the pump to the reducing agent injection valve; a reducing agent return passage connected between the reducing agent supply passage and the tank; and a pressure sensor for detecting reducing agent pressure within the reducing agent supply passage, wherein injection control of the liquid reducing agent by the reducing agent injection valve is performed while the reducing agent pressure is controlled so as to be maintained at a predetermined target pressure, wherein the reducing agent supply apparatus also comprises:
a passage throttle valve provided on the reducing agent return passage and having an opening controlled according to a change in an operation amount of the reducing agent injection valve; and
a pump controller for feedback-controlling output of the pump based on a difference between the reducing agent pressure and the target pressure,
wherein the passage throttle valve is configured to normally open at a predetermined basic opening; when the operation amount of the reducing agent injection valve sharply increases, temporarily decreases the opening of the passage throttle valve; and, when the operation amount of the reducing agent injection valve sharply decreases, temporarily increases the opening of the passage throttle valve.

2. A reducing agent supply apparatus comprising: a pump for sucking up and pumping liquid reducing agent stored in a tank; a reducing agent injection valve for injecting the liquid reducing agent to within an exhaust gas passageway of an internal-combustion engine; a reducing agent supply passage for guiding the liquid reducing agent pumped from the pump to the reducing agent injection valve; a reducing agent return passage connected between the reducing agent supply passage and the tank; and a pressure sensor for detecting reducing agent pressure within the reducing agent supply passage, wherein injection control of the liquid reducing agent by the reducing agent injection valve is performed while the reducing agent pressure is controlled so as to be maintained at a predetermined target pressure, wherein the reducing agent supply apparatus also comprises:
a passage throttle valve provided on the reducing agent return passage and having an opening controlled according to a change in an operation amount of the reducing agent injection valve, wherein the passage throttle valve is configured to open with an operation amount varied according to the amount of change in the operation amount of the reducing agent injection valve;
a pump controller for feedback-controlling output of the pump based on a difference between the reducing agent pressure and the target pressure; and
a correction means for correcting the duration or the operation amount for changing the opening of the passage throttle valve so that, when the opening of the passage throttle valve is temporarily changed to cause the reducing agent pressure to be more than an upper limit threshold or less than a lower limit threshold, the reducing agent pressure will be within a range between the lower and upper limit thresholds next time and later.

3. The reducing agent supply apparatus according to claim 1, wherein the passage throttle valve is configured to open with a duration varied according to the amount of change in the operation amount of the reducing agent injection valve.

4. The reducing agent supply apparatus according to claim 1, wherein the passage throttle valve is configured to open with an operation amount varied according to the amount of change in the operation amount of the reducing agent injection valve.

5. The reducing agent supply apparatus according to claim 3, comprising a correction means for correcting the duration or the operation amount for changing the opening of the passage throttle valve so that, when the opening of the passage throttle valve is temporarily changed to cause the reducing agent pressure to be more than an upper limit threshold or less than a lower limit threshold, the reducing agent pressure will be within a range between the lower and upper limit thresholds next time and later.

6. The reducing agent supply apparatus according to claim 1, comprising: a passage switching valve that, while injection control of the liquid reducing agent is being performed, is not energized and causes pumped liquid reducing agent to flow to a reducing agent injection valve side, and, when the injection control of the liquid reducing agent is terminated, is energized and causes the pumped liquid reducing agent to flow to a tank side; and a passage switching valve control means for controlling energization of the passage switching valve, wherein the pump, the passage throttle valve and the passage switching valve are configured as one unit,
and
wherein the control of the passage throttle valve and the control of the passage switching valve are performed through one harness.

7. An internal-combustion engine exhaust gas purification apparatus comprising: the reducing agent supply apparatus according to claim 1; and an NOx purification catalyst for purifying nitrogen oxides contained within exhaust gas.

8. The apparatus according to claim 7, wherein the passage throttle valve is configured to normally open at a predetermined basic opening; when the operation amount of the reducing agent injection valve sharply increases, temporarily decreases the opening of the passage throttle valve; and, when the operation amount of the reducing agent injection valve sharply decreases, temporarily increases the opening of the passage throttle valve.

9. The apparatus according to claim 7, wherein the passage throttle valve is configured to open with a duration varied according to the amount of change in the operation amount of the reducing agent injection valve.

10. The apparatus according to claim 7, wherein the passage throttle valve is configured to open with an operation amount varied according to the amount of change in the operation amount of the reducing agent injection valve.

11. The apparatus according to claim 9, comprising a correction means for correcting the duration or the operation amount for changing the opening of the passage throttle valve so that, when the opening of the passage throttle valve is temporarily changed to cause the reducing agent pressure to be more than an upper limit threshold or less than a lower limit threshold, the reducing agent pressure will be within a range between the lower and upper limit thresholds next time and later.

12. The apparatus according to claim 7, comprising: a passage switching valve that, while injection control of the liquid reducing agent is being performed, is not energized and causes pumped liquid reducing agent to flow to a reducing agent injection valve side, and, when the injection control of the liquid reducing agent is terminated, is energized and causes the pumped liquid reducing agent to flow to a tank side; and a passage switching valve control means for controlling energization of the passage switching valve,
wherein the pump, the passage throttle valve and the passage switching valve are configured as one unit, and
wherein the control of the passage throttle valve and the control of the passage switching valve are performed through one harness.

13. A reducing agent supply apparatus comprising: a pump for sucking up and pumping liquid reducing agent stored in a tank; a reducing agent injection valve for injecting the liquid reducing agent to within an exhaust gas passageway of an internal-combustion engine; a reducing agent supply passage for guiding the liquid reducing agent pumped from the pump to the reducing agent injection valve; a reducing agent return passage connected between the reducing agent supply passage and the tank; and a pressure sensor for detecting reducing agent pressure within the reducing agent supply passage, wherein injection control of the liquid reducing agent by the reducing agent injection valve is performed while the reducing agent pressure is controlled so as to be maintained at a predetermined target pressure,
wherein the reducing agent supply apparatus also comprises:
a passage throttle valve provided on the reducing agent return passage and having an opening controlled according to a change in an operation amount of the reducing agent injection valve, wherein the passage throttle valve is configured to open with a duration varied according to the amount of change in the operation amount of the reducing agent injection valve;
a pump controller for feedback-controlling output of the pump based on a difference between the reducing agent pressure and the target pressure; and
a correction means for correcting the duration or the operation amount for changing the opening of the passage throttle valve so that, when the opening of the passage throttle valve is temporarily changed to cause the reducing agent pressure to be more than an upper limit threshold or less than a lower limit threshold, the reducing agent pressure will be within a range between the lower and upper limit thresholds next time and later.

14. The reducing agent supply apparatus according to claim 2, wherein the passage throttle valve is configured to normally open at a predetermined basic opening; when the operation amount of the reducing agent injection valve sharply increases, temporarily decreases the opening of the passage throttle valve; and, when the operation amount of the reducing agent injection valve sharply decreases, temporarily increases the opening of the passage throttle valve.

* * * * *